Oct. 6, 1925.
W. O. STODDARD, JR
1,556,261
DULL FINISH COATING AND THE PROCESS OF MAKING SAME
Filed Dec. 12, 1919
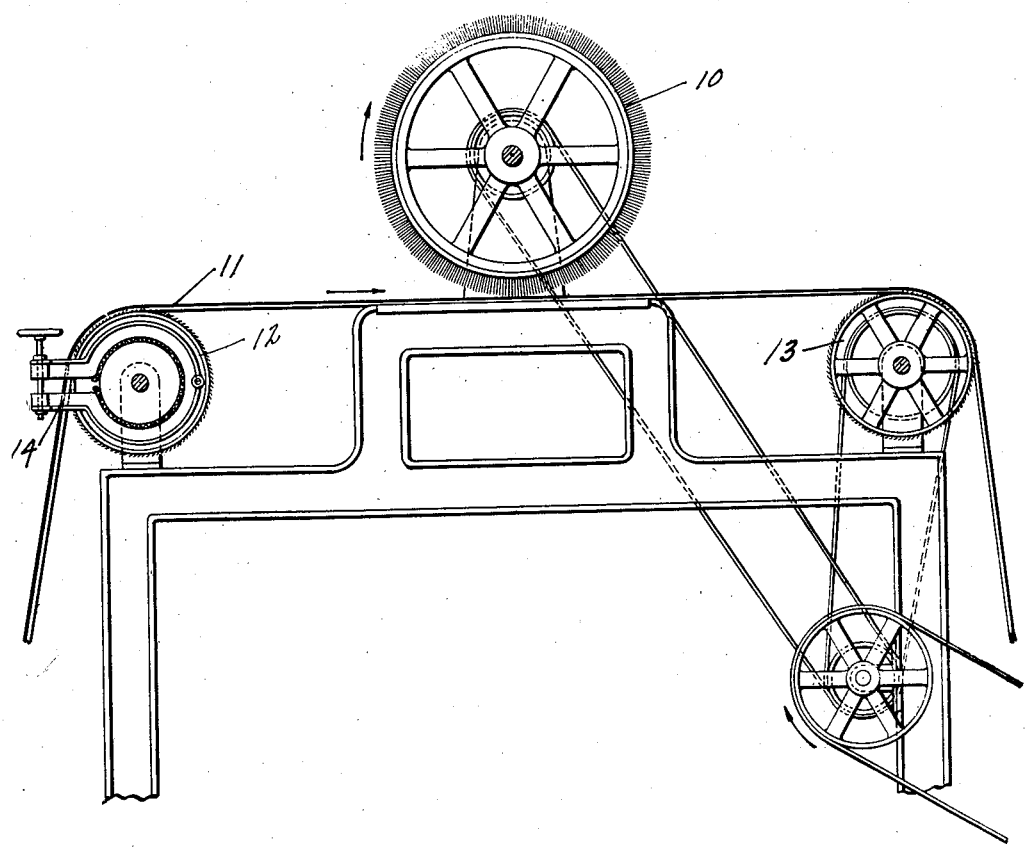
Inventor:
William O. Stoddard, Jr.
By Chester H. Braselton
Attorney.

Patented Oct. 6, 1925.

1,556,261

UNITED STATES PATENT OFFICE.

WILLIAM O. STODDARD, JR., OF MADISON, NEW JERSEY, ASSIGNOR TO DURATEX CORPORATION, OF NEWARK, NEW JERSEY, A CORPORATION OF NEW JERSEY.

DULL-FINISH COATING AND THE PROCESS OF MAKING SAME.

Application filed December 12, 1919. Serial No. 344,416.

*To all whom it may concern:*

Be it known that I, WILLIAM O. STODDARD, Jr., a citizen of the United States, residing at Madison, New Jersey, have invented certain new and useful Improvements in Dull-Finish Coating and the Processes of Making Same, of which I declare the following to be a full, clear, and exact description.

My invention relates to improvements in coatings and the process of making same. It relates more particularly to coatings such as are used to produce a leather finish or surface.

In order to provide, in an artificial leather, the necessary finish and wearing qualities, it has been necessary to apply to the fabric base a waterproofing coating of such a character that the resulting product has a high gloss or lustre. For many uses, this is undesirable and does not meet with the demands of the trade. To overcome this, it has been customary to load the coating very heavily with the proper pigments but, when the lustre has been dulled in this manner, the coating is overloaded with pigment and will crock or smudge. This renders the artificial leather thus produced unsatisfactory for many uses, as, for instance, in upholstery work in chairs, automobile and carriage upholstery and similar situations.

The chief object of my invention is to provide an artificial leather which has a dull finish but which is not lacking in the good qualities of a high finish artificial leather and which will not crock or smudge.

Further objects will appear from the detailed description to follow.

In general, I accomplish the objects of my invention by preparing on a suitable base, a coating with a comparatively high gloss or lustre and, then, subjecting the surface thereof to a slight surface abrasion.

In the drawing, I have illustrated diagrammatically one method of dulling the lustre by surface abrasion. In carrying out my invention, I may prepare an artificial leather in any of the well-known ways and it is unnecessary in making it to make any provision in the composition of the coating for dulling the finish or lustre. I have found that very desirable results may be attained with an artificial leather prepared by applying successive coatings of a pyroxylin solution to a suitable fabric base. The pyroxylin solution may carry a suitable diluent, such as castor oil, to produce a coating of the desired flexibility, and the pigment necessary to produce a finish of the desired color is incorporated in the pyroxylin solution. When a coating of the desired thickness has been built up, a capping coat which is usually a clear pyroxylin solution is added. This serves to confine and retain the pigment carrying coatings. After the final coating has been applied, the material may be finished, as by embossing, and is then dried. In some cases, a lustre coat of clear varnish is applied as the last step and in other cases, a japanning coat is used, in which case the material is baked after the application of the coat. The artificial leather thus prepared has a comparatively high gloss or lustre since I add only enough pigment to give the desired color and do not add any surplus to dull the lustre.

I then pass the material 11 past a rapidly revolving brush 10 which acts on the surface of the coating and produces a slight surface abrasion. This may be done by carrying the coated fabric over a tension drum 12, past the revolving brush 10 and over a drag roll 13. The speed with which the fabric is moved can be regulated by regulating the speed of roll 13 and the pressure with which brush 10 engages the surface of the coating may be varied by adjusting the friction brake 14 on tension drum 12. The revolving brush 10 should have bristles of sufficient rigidity to slightly scratch the surface of the coating and the rigidity of the bristles, the speed of revolution of the brush, the speed with which the goods are carried past the brush, and the tension on the goods should all be regulated so as to abrade slightly the surface of the coating without penetrating or breaking it to any considerable extent. This slight abrasion of the surface dulls the finish or lustre on the goods without causing any material weakening or deterioration.

I may also accomplish this result by subjecting the surface of the goods to the action of a sand blast. The strength of the sand blast and the speed with which the goods travel through it should be so regulated as to secure a slight abrasion of the surface without causing any considerable penetration.

I believe that the effect produced is due to a reduction of the transparency of the surface coating because of the slight scratching or abrading action thereon thus affecting the refraction of light from the pigment carrying coatings.

My invention is not restricted to producing a dull finish on pyroxylin coatings or on other coatings such as are used in making artificial or imitation leather. I contemplate as within the scope of my invention producing a dull finish on any coating having a relatively high gloss or lustre by subjecting the surface of such coating to a slight abrasion. Neither am I restricted to the means disclosed for securing such slight abrasion, the means disclosed being merely illustrative of possible means for abrading the surface.

I am aware that the particular embodiment of my invention here shown and described is susceptible of considerable variation without departing from the spirit of my invention and, therefore, I desire to claim my invention broadly, as well as specifically, as indicated by the appended claims.

Having thus described my invention, what I claim as new and desire to secure by Letters Patent, is:—

1. A coated material comprising a base and a nitrocellulose coating applied thereto, the surface of said coating being provided with a plurality of relatively slight abrasions.

2. A coated material comprising a base, a pigment carrying nitrocellulose coating applied thereto, and a surface coating having an abraded surface.

3. A dull finish coated fabric comprising a fabric base, a pigment carrying coating applied thereto, and a surface coating applied to and confining said pigment carrying coating and having an abraded surface.

4. A dull finish artificial leather comprising a fabric base, a pigment carrying pyroxylin coating applied thereto, and a surface coating applied thereto and having an abraded surface.

5. A dull finish artificial leather comprising a fabric base, a pigment carrying coating applied thereto, and a capping coating having a plurality of relatively slight abrasions upon its surface.

6. The process of producing a dull finish coated fabric comprising applying a nitrocellulose coating to a suitable base and then providing the surface of said coating with a plurality of relatively slight abrasions.

7. The process of producing an artificial leather having a dull finish comprising applying a suitable coating to a base, then applying a capping coating, drying said coatings, and then subjecting the surface of the capping coating to slight abrasive action.

8. The process of producing a dull finish on a coated fabric comprising subjecting the dried, coated surface thereof to a rapidly revolving brush.

In testimony whereof, I affix my signature.

WILLIAM O. STODDARD, Jr.